(12) United States Patent
Smith et al.

(10) Patent No.: US 8,195,136 B2
(45) Date of Patent: Jun. 5, 2012

(54) METHODS OF PROVIDING CALLER IDENTIFICATION INFORMATION AND RELATED REGISTRIES AND RADIOTELEPHONE NETWORKS

(75) Inventors: Donald Smith, Vinemont, AL (US); Frederick Diggle, III, Birmingham, AL (US); Steven Ryals, Pinson, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1549 days.

(21) Appl. No.: 10/891,883

(22) Filed: Jul. 15, 2004

(65) Prior Publication Data

US 2006/0013375 A1    Jan. 19, 2006

(51) Int. Cl.
   *H04M 3/42*       (2006.01)
   *H04W 4/00*       (2009.01)

(52) U.S. Cl. .............. 455/415; 455/432.1; 455/433

(58) Field of Classification Search .......... 455/415, 455/414.1, 416; 379/142, 245, 142.01, 142.04, 379/142.05, 142.06
See application file for complete search history.

(56) References Cited

U.S. PATENT DOCUMENTS

| | | |
|---|---|---|
| 4,266,098 A | 5/1981 | Novak |
| 4,268,722 A | 5/1981 | Little et al. |
| 4,277,649 A | 7/1981 | Sheinbein |
| 4,582,956 A | 4/1986 | Doughty |
| 4,649,433 A | 3/1987 | Verhoeven |
| 4,649,533 A | 3/1987 | Chorley et al. |
| 4,663,777 A | 5/1987 | Szeto |
| 4,674,115 A | 6/1987 | Kaleita et al. |
| 4,698,839 A | 10/1987 | DeVaney et al. |
| 4,791,664 A | 12/1988 | Lutz et al. |
| 4,797,911 A | 1/1989 | Szlam et al. |
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |

(Continued)

FOREIGN PATENT DOCUMENTS

EP     0 821 511     1/1998

(Continued)

OTHER PUBLICATIONS

U.S. Appl. No. 09/468,888, filed Dec. 22, 1999, Bedingfield.

(Continued)

*Primary Examiner* — Michael Thier
(74) *Attorney, Agent, or Firm* — Cantor Colburn LLP

(57) ABSTRACT

Caller identification information may be provided for a plurality of radiotelephone networks operated by a plurality of service providers. For example, a registry may be provided including a first serial number and a first identification other than the first serial number for a first radiotelephone registered for service with a first service provider operating a first radiotelephone network. The registry may also include a second serial number and a second identification other than the second serial number for a second radiotelephone registered for service with a second service provider operating a second radiotelephone network. A caller identification request may be accepted from the second radiotelephone network operated by the second service provider wherein the caller identification request includes the first serial number for the first radiotelephone. Responsive to accepting the caller identification request, a caller identification response may be provided to the second radiotelephone network wherein the caller identification response includes the first identification for the first radiotelephone. Related radiotelephone networks and registries are also discussed.

12 Claims, 3 Drawing Sheets

U.S. PATENT DOCUMENTS

| | | |
|---|---|---|
| 4,850,103 A | 7/1989 | Takemoto et al. |
| 4,955,075 A | 9/1990 | Anderson |
| 5,029,196 A | 7/1991 | Morganstein |
| 5,109,405 A | 4/1992 | Morganstein |
| 5,121,423 A | 6/1992 | Morihiro |
| 5,151,929 A | 9/1992 | Wolf |
| 5,157,712 A | 10/1992 | Wallen, Jr. et al. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,333,186 A | 7/1994 | Gupta |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Sebetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. et al. |
| 5,703,934 A | 12/1997 | Zicker et al. |
| 5,703,943 A | 12/1997 | Otto |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Cjamg et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,872,934 A | 2/1999 | Whitehouse et al. |
| 5,875,239 A | 2/1999 | Koralewski et al. |
| 5,875,241 A | 2/1999 | Chang et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannhenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,918,213 A | 6/1999 | Bernard et al. |
| 5,923,744 A | 7/1999 | Cheng |
| 5,930,701 A | 7/1999 | Skog |
| 5,940,484 A | 8/1999 | De Fazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,838,774 A | 11/1999 | Zheng |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |
| 6,058,171 A | 5/2000 | Hoopes |
| 6,061,434 A | 5/2000 | Corbett |
| 6,061,566 A | 5/2000 | Friman |
| 6,064,876 A | 5/2000 | Ishida et al. |
| 6,065,844 A | 5/2000 | Chen |

| | | | | | | |
|---|---|---|---|---|---|---|
| 6,072,859 | A | 6/2000 | Kong | 6,353,664 | B1 | 3/2002 | Cannon et al. |
| 6,078,581 | A | 6/2000 | Shtivelman et al. | 6,361,637 | B1 | 3/2002 | Martin et al. |
| 6,091,947 | A | 7/2000 | Sumner | 6,363,140 | B1 | 3/2002 | Pinard |
| 6,094,478 | A | 7/2000 | Shepherd et al. | 6,363,411 | B1 | 3/2002 | Dugan et al. |
| 6,094,573 | A | 7/2000 | Heinonen et al. | 6,366,661 | B1 | 4/2002 | Devillier et al. |
| 6,094,574 | A | 7/2000 | Vance et al. | 6,366,772 | B1 | 4/2002 | Arnson |
| 6,094,575 | A | 7/2000 | Anderson et al. | 6,377,807 | B1 | 4/2002 | Iparrea et al. |
| 6,101,246 | A | 8/2000 | Heinmiller et al. | 6,377,979 | B1 | 4/2002 | Yamashita et al. |
| 6,104,784 | A | 8/2000 | Robbins | 6,389,124 | B1 | 5/2002 | Schnarel et al. |
| 6,104,800 | A | 8/2000 | Benson | 6,389,132 | B1 | 5/2002 | Price |
| 6,108,630 | A | 8/2000 | Kuechler et al. | 6,400,809 | B1 | 6/2002 | Bossemeyer et al. |
| 6,111,939 | A | 8/2000 | Brabanec | 6,400,947 | B1 | 6/2002 | Bright et al. |
| 6,134,235 | A | 10/2000 | Goldman et al. | 6,404,868 | B1 | 6/2002 | Beamish et al. |
| 6,134,311 | A | 10/2000 | Ekstrom | 6,404,875 | B2 | 6/2002 | Malik et al. |
| 6,137,870 | A | 10/2000 | Scherer | 6,411,692 | B1 | 6/2002 | Scherer |
| 6,137,871 | A | 10/2000 | Maier | 6,421,425 | B1 | 7/2002 | Bossi et al. |
| 6,141,341 | A | 10/2000 | Jones et al. | 6,422,263 | B1 | 7/2002 | Spicer |
| 6,141,409 | A | 10/2000 | Madoch et al. | 6,427,003 | B1 | 7/2002 | Corbett et al. |
| 6,144,644 | A | 11/2000 | Bajzath et al. | 6,427,064 | B1 | 7/2002 | Henderson |
| 6,154,531 | A | 11/2000 | Clapper | 6,434,394 | B1 | 8/2002 | Grundvig et al. |
| 6,160,876 | A | 12/2000 | Moss et al. | 6,437,879 | B1 | 8/2002 | Temple |
| 6,161,021 | A | 12/2000 | Akpa | 6,438,216 | B1 | 8/2002 | Aktas |
| 6,163,595 | A | 12/2000 | Parker et al. | 6,438,217 | B1 | 8/2002 | Huna |
| 6,163,607 | A | 12/2000 | Bogart et al. | 6,438,584 | B1 | 8/2002 | Powers |
| 6,163,691 | A | 12/2000 | Buettner et al. | 6,442,249 | B1 | 8/2002 | Miller, Jr. |
| 6,167,254 | A | 12/2000 | Chavez, Jr. et al. | 6,442,262 | B1 | 8/2002 | Moss et al. |
| 6,169,911 | B1 | 1/2001 | Wagner et al. | 6,442,263 | B1 | 8/2002 | Beaton et al. |
| 6,173,049 | B1 | 1/2001 | Malik | 6,442,283 | B1 | 8/2002 | Tewfik et al. |
| 6,178,232 | B1 | 1/2001 | Latter et al. | 6,445,781 | B1 | 9/2002 | Heinmiller et al. |
| 6,181,928 | B1 | 1/2001 | Moon | 6,449,351 | B1 | 9/2002 | Moss et al. |
| D437,879 | S | 2/2001 | Weinandt | 6,449,361 | B1 | 9/2002 | Okuda |
| 6,185,289 | B1 | 2/2001 | Hetz et al. | 6,462,646 | B2 | 10/2002 | Helferich |
| 6,192,115 | B1 | 2/2001 | Toy et al. | 6,466,653 | B1 | 10/2002 | Hamrick et al. |
| 6,192,116 | B1 | 2/2001 | Mayak | 6,477,246 | B1 | 11/2002 | Dolan et al. |
| 6,198,480 | B1 | 3/2001 | Cotugno et al. | 6,480,589 | B1 | 11/2002 | Lee et al. |
| 6,198,920 | B1 | 3/2001 | Doviak et al. | 6,483,898 | B2 | 11/2002 | Lew et al. |
| 6,202,023 | B1 | 3/2001 | Hancock et al. | 6,493,430 | B2 | 12/2002 | Leuca et al. |
| 6,219,407 | B1 | 4/2001 | Kanevsky et al. | 6,493,431 | B1 | 12/2002 | Troen-Krasnow et al. |
| 6,219,413 | B1 | 4/2001 | Burg | 6,493,437 | B1 | 12/2002 | Olshansky |
| 6,222,826 | B1 | 4/2001 | Faynberg et al. | 6,493,439 | B2 | 12/2002 | Lung et al. |
| 6,226,367 | B1 | 5/2001 | Smith et al. | 6,494,953 | B2 | 12/2002 | Hayes et al. |
| 6,226,369 | B1 | 5/2001 | Lim et al. | 6,496,569 | B2 | 12/2002 | Pelletier |
| 6,226,399 | B1 | 5/2001 | Robinson | 6,496,571 | B1 | 12/2002 | Wilson |
| 6,229,883 | B1 | 5/2001 | Kakizaki et al. | 6,496,692 | B1 | 12/2002 | Shanahan |
| 6,230,006 | B1 | 5/2001 | Keenan et al. | 6,498,841 | B2 | 12/2002 | Bull et al. |
| 6,233,325 | B1 | 5/2001 | Frech et al. | 6,507,737 | B1 | 1/2003 | Laham et al. |
| 6,236,975 | B1 | 5/2001 | Boe et al. | 6,529,500 | B1 | 3/2003 | Pandharipande |
| 6,243,448 | B1 | 6/2001 | Corbett et al. | 6,529,591 | B1 | 3/2003 | Dosani et al. |
| 6,243,461 | B1 | 6/2001 | Hwang | 6,532,490 | B1 | 3/2003 | Lewis et al. |
| 6,246,976 | B1 | 6/2001 | Mukaigawa et al. | 6,539,080 | B1 | 3/2003 | Bruce et al. |
| 6,252,952 | B1 | 6/2001 | Kung et al. | 6,542,583 | B1 | 4/2003 | Taylor |
| 6,256,671 | B1 | 7/2001 | Strentzsch et al. | 6,542,586 | B1 | 4/2003 | Helstab |
| 6,262,987 | B1 | 7/2001 | Mogul | 6,542,591 | B1 | 4/2003 | Amno et al. |
| 6,266,399 | B1 | 7/2001 | Weller et al. | 6,542,602 | B1 | 4/2003 | Elazar |
| 6,278,704 | B1 | 8/2001 | Creamer et al. | 6,542,812 | B1 | 4/2003 | Obradovich et al. |
| 6,278,862 | B1 | 8/2001 | Henderson | 6,546,092 | B2 | 4/2003 | Corbett |
| 6,282,275 | B1 | 8/2001 | Gurbani | 6,549,621 | B1 | 4/2003 | Christie, IV et al. |
| 6,292,479 | B1 | 9/2001 | Bartholomew et al. | 6,553,110 | B1 | 4/2003 | Peng |
| 6,292,549 | B1 | 9/2001 | Lung et al. | 6,553,221 | B2 | 4/2003 | Nakamura et al. |
| 6,295,502 | B1 | 9/2001 | Hancock et al. | 6,556,540 | B1 | 4/2003 | Mawhinney et al. |
| 6,301,342 | B1 | 10/2001 | Ander et al. | 6,560,317 | B1 | 5/2003 | Quagliana |
| 6,301,350 | B1 | 10/2001 | Henningson et al. | 6,560,327 | B1 | 5/2003 | McConnell |
| 6,304,644 | B2 | 10/2001 | Karnowski | 6,566,995 | B2 | 5/2003 | Furuuchi et al. |
| 6,310,943 | B1 | 10/2001 | Kowalski | 6,570,971 | B2 | 5/2003 | Latter et al. |
| 6,311,057 | B1 | 10/2001 | Barvesten | 6,570,974 | B1 | 5/2003 | Gerszberg et al. |
| 6,317,488 | B1 | 11/2001 | De Pond et al. | 6,574,319 | B2 | 6/2003 | Latter et al. |
| 6,317,781 | B1 | 11/2001 | De Boor et al. | 6,584,490 | B1 | 6/2003 | Schuster et al. |
| 6,324,263 | B1 | 11/2001 | Sherwood et al. | 6,587,458 | B1 | 7/2003 | Burg et al. |
| 6,324,271 | B1 | 11/2001 | Sawyer et al. | 6,590,970 | B1 | 7/2003 | Cai et al. |
| 6,327,347 | B1 | 12/2001 | Gutzmann | 6,597,905 | B1 | 7/2003 | Hijii |
| 6,332,021 | B2 | 12/2001 | Latter et al. | 6,603,840 | B2 | 8/2003 | Fellingham et al. |
| 6,333,973 | B1 | 12/2001 | Smith et al. | 6,603,854 | B1 | 8/2003 | Judkins et al. |
| 6,337,904 | B1 | 1/2002 | Gisby | 6,608,891 | B1 | 8/2003 | Pelletier et al. |
| 6,337,979 | B1 | 1/2002 | Nakayasu | 6,618,474 | B1 | 9/2003 | Reese |
| 6,339,639 | B1 | 1/2002 | Henderson | 6,625,595 | B1 | 9/2003 | Anderson et al. |
| 6,341,161 | B1 | 1/2002 | Latter et al. | 6,631,181 | B1 | 10/2003 | Bates et al. |
| 6,345,187 | B1 | 2/2002 | Berthound et al. | 6,633,633 | B1 | 10/2003 | Bedingfield |
| 6,347,136 | B1 | 2/2002 | Horan | 6,639,979 | B1 | 10/2003 | Kim |
| 6,351,637 | B1 | 2/2002 | Lee | 6,650,743 | B2 | 11/2003 | Heinmiller et al. |

| | | | | | | |
|---|---|---|---|---|---|---|
| 6,661,785 B1 | 12/2003 | Zhang et al. | 6,947,531 B1 | 9/2005 | Lewis et al. | |
| 6,665,378 B1 | 12/2003 | Spielman et al. | 6,952,469 B2 | 10/2005 | Han | |
| 6,665,388 B2 | 12/2003 | Bedingfield | 6,977,993 B2 | 12/2005 | Starbuck et al. | |
| 6,665,715 B1 | 12/2003 | Houri | 7,016,482 B2 | 3/2006 | Moss et al. | |
| 6,675,008 B1 | 1/2004 | Paik et al. | 7,027,408 B2 | 4/2006 | Nabkel et al. | |
| 6,677,894 B2 | 1/2004 | Sheynblat et al. | 7,027,569 B2 | 4/2006 | Price | |
| 6,683,870 B1 | 1/2004 | Archer | 7,085,257 B1 | 8/2006 | Karves et al. | |
| 6,687,341 B1 | 2/2004 | Koch et al. | 7,085,578 B2 | 8/2006 | Barclay et al. | |
| 6,697,357 B2 | 2/2004 | Emerson, III | 7,095,715 B2 | 8/2006 | Buckman et al. | |
| 6,701,160 B1 | 3/2004 | Pinder et al. | 7,097,169 B2 | 8/2006 | Mueller | |
| 6,714,519 B2 | 3/2004 | Luzzatti et al. | 7,184,533 B1 | 2/2007 | Shaffer et al. | |
| 6,718,021 B2 | 4/2004 | Crockett et al. | 7,200,673 B1 | 4/2007 | Augart | |
| 6,721,407 B1 | 4/2004 | Michelena | 7,215,750 B2 | 5/2007 | Nguyen et al. | |
| 6,724,872 B1 | 4/2004 | Moore et al. | 7,228,129 B1 | 6/2007 | Ward et al. | |
| 6,728,355 B2 | 4/2004 | Kowalski | 7,254,226 B1 | 8/2007 | Roberts et al. | |
| 6,728,360 B1 | 4/2004 | Brennan | 7,257,210 B1 | 8/2007 | Henderson | |
| 6,728,365 B1 | 4/2004 | Li et al. | 7,313,227 B2 | 12/2007 | Jones | |
| 6,731,727 B2 | 5/2004 | Corbett | 7,315,614 B2 | 1/2008 | Bedingfield, Sr. et al. | |
| 6,732,188 B1 | 5/2004 | Flockhart et al. | 7,315,618 B1 | 1/2008 | Moton et al. | |
| 6,738,615 B1 | 5/2004 | Chow et al. | 7,385,992 B2 | 6/2008 | Koch et al. | |
| 6,748,058 B1 | 6/2004 | Schwend et al. | 7,386,319 B2 | 6/2008 | Rogalski et al. | |
| 6,748,068 B1 | 6/2004 | Walsh et al. | 7,403,768 B2 | 7/2008 | Bedingfield, Sr. et al. | |
| 6,751,457 B1 | 6/2004 | Martin | 7,418,096 B2 | 8/2008 | Moton et al. | |
| 6,757,274 B1 | 6/2004 | Bedingfield et al. | 7,443,964 B2 | 10/2008 | Urban et al. | |
| 6,757,732 B1 | 6/2004 | Sollee et al. | 7,613,810 B2 | 11/2009 | Romero et al. | |
| 6,757,740 B1 | 6/2004 | Parekh et al. | 7,623,645 B1 | 11/2009 | Scott et al. | |
| 6,760,413 B2 | 7/2004 | Cannon et al. | 7,631,047 B1 | 12/2009 | Adamczyk et al. | |
| 6,765,998 B2 | 7/2004 | Bruce et al. | 7,653,191 B1 | 1/2010 | Glasser et al. | |
| 6,766,003 B2 | 7/2004 | Moss et al. | 7,672,444 B2 | 3/2010 | Perrella et al. | |
| 6,768,792 B1 | 7/2004 | Brown et al. | 2001/0002209 A1 | 5/2001 | Han | |
| D494,953 S | 8/2004 | Leung | 2001/0005854 A1 | 6/2001 | Murata et al. | |
| 6,771,754 B2 | 8/2004 | Pelletier et al. | 2001/0006519 A1 | 7/2001 | Voit | |
| 6,771,755 B1 | 8/2004 | Simpson | 2001/0036174 A1 | 11/2001 | Herring | |
| 6,771,956 B1 | 8/2004 | Beeler | 2001/0044898 A1 | 11/2001 | Benussi | |
| 6,775,366 B1 | 8/2004 | Cobbett et al. | 2001/0048737 A1 | 12/2001 | Goldberg et al. | |
| 6,775,540 B2 | 8/2004 | Iyer | 2002/0004382 A1* | 1/2002 | Cox et al. | 455/414 |
| 6,778,524 B1 | 8/2004 | Augart | 2002/0007400 A1 | 1/2002 | Pedersen | |
| 6,779,020 B1 | 8/2004 | Henrick | 2002/0009184 A1 | 1/2002 | Ahnier | |
| 6,785,301 B1 | 8/2004 | Chapman et al. | 2002/0012426 A1 | 1/2002 | Gupton | |
| 6,785,368 B1 | 8/2004 | Eason et al. | 2002/0016748 A1 | 2/2002 | Emodi et al. | |
| 6,785,540 B1 | 8/2004 | Wichelman | 2002/0023265 A1 | 2/2002 | Metcalf | |
| 6,792,266 B1 | 9/2004 | Masuda et al. | 2002/0041605 A1 | 4/2002 | Benussi et al. | |
| 6,798,841 B2 | 9/2004 | Hansen | 2002/0055926 A1 | 5/2002 | Dan et al. | |
| 6,798,876 B1 | 9/2004 | Bala | 2002/0067816 A1 | 6/2002 | Bushnell | |
| 6,798,879 B1 | 9/2004 | Beham | 2002/0077102 A1 | 6/2002 | Achuthan et al. | |
| 6,807,267 B2 | 10/2004 | Moss et al. | 2002/0082050 A1 | 6/2002 | Mountney et al. | |
| 6,810,077 B1 | 10/2004 | Dezonno | 2002/0085687 A1 | 7/2002 | Contractor et al. | |
| 6,810,115 B2 | 10/2004 | Fukuda | 2002/0090933 A1 | 7/2002 | Rouse et al. | |
| 6,813,344 B1 | 11/2004 | Lemke | 2002/0091777 A1 | 7/2002 | Schwartz | |
| 6,816,481 B1 | 11/2004 | Adams et al. | 2002/0094826 A1 | 7/2002 | Lee | |
| 6,818,474 B2 | 11/2004 | Kim et al. | 2002/0118812 A1 | 8/2002 | Contractor | |
| 6,826,270 B1 | 11/2004 | Welch et al. | 2002/0119430 A1 | 8/2002 | Szynalski | |
| 6,826,271 B1 | 11/2004 | Kanabar et al. | 2002/0120629 A1 | 8/2002 | Leonard | |
| 6,826,617 B1 | 11/2004 | Ansell et al. | 2002/0122401 A1 | 9/2002 | Xiang et al. | |
| 6,829,348 B1 | 12/2004 | Schroeder et al. | 2002/0125929 A1 | 9/2002 | Chen et al. | |
| 6,830,595 B2 | 12/2004 | Reynolds, III | 2002/0128033 A1 | 9/2002 | Burgess | |
| 6,831,974 B1 | 12/2004 | Watson et al. | 2002/0136381 A1 | 9/2002 | Shaffer et al. | |
| 6,842,512 B2 | 1/2005 | Pedersen | 2002/0171581 A1 | 11/2002 | Sheynblat et al. | |
| 6,845,151 B2 | 1/2005 | Peng | 2002/0172338 A1 | 11/2002 | Lee et al. | |
| 6,845,512 B2 | 1/2005 | Horng et al. | 2002/0176563 A1 | 11/2002 | Kryvossidis et al. | |
| 6,853,710 B2 | 2/2005 | Harris | 2002/0183098 A1 | 12/2002 | Lee et al. | |
| 6,853,711 B2 | 2/2005 | Brsebois et al. | 2002/0188443 A1 | 12/2002 | Reddy et al. | |
| 6,859,527 B1 | 2/2005 | Banks et al. | 2002/0191755 A1 | 12/2002 | Lew et al. | |
| 6,865,266 B1 | 3/2005 | Pershan | 2002/0196913 A1 | 12/2002 | Ruckart | |
| 6,865,384 B2 | 3/2005 | Sagi et al. | 2002/0196914 A1 | 12/2002 | Ruckart | |
| 6,868,155 B1 | 3/2005 | Cannon et al. | 2002/0197991 A1* | 12/2002 | Anvekar et al. | 455/432 |
| 6,870,924 B1 | 3/2005 | Ukon | 2003/0002633 A1 | 1/2003 | Kredo et al. | |
| 6,888,927 B1 | 5/2005 | Cruickshank et al. | 2003/0006912 A1 | 1/2003 | Brescia | |
| 6,888,972 B2 | 5/2005 | Berg et al. | 2003/0007620 A1 | 1/2003 | Elsey et al. | |
| 6,891,940 B1 | 5/2005 | Bhandari et al. | 2003/0012353 A1 | 1/2003 | Tang | |
| 6,898,275 B2 | 5/2005 | Dolan et al. | 2003/0016800 A1 | 1/2003 | Fukuda | |
| 6,904,276 B1 | 6/2005 | Freeman et al. | 2003/0021290 A1 | 1/2003 | Jones | |
| 6,907,034 B1 | 6/2005 | Begis | 2003/0022659 A1 | 1/2003 | Mun et al. | |
| 6,909,777 B2 | 6/2005 | Latter et al. | 2003/0026413 A1 | 2/2003 | Brandt et al. | |
| 6,914,953 B2 | 7/2005 | Boerstler | 2003/0026416 A1 | 2/2003 | Fusco | |
| 6,917,960 B1 | 7/2005 | Decasper et al. | 2003/0032414 A1 | 2/2003 | Melaku | |
| 6,922,411 B1 | 7/2005 | Taylor | 2003/0043974 A1 | 3/2003 | Emerson, III | |
| 6,928,154 B2 | 8/2005 | Cheaito et al. | 2003/0050100 A1* | 3/2003 | Dent | 455/562 |
| 6,931,007 B2 | 8/2005 | Jones | 2003/0053602 A1 | 3/2003 | Stuckman et al. | |

| | | |
|---|---|---|
| 2003/0063730 A1 | 4/2003 | Woodring |
| 2003/0063731 A1 | 4/2003 | Woodring |
| 2003/0065776 A1 | 4/2003 | Malik et al. |
| 2003/0068020 A1 | 4/2003 | Hamrick et al. |
| 2003/0092384 A1 | 5/2003 | Ross |
| 2003/0092432 A1 | 5/2003 | Hwang |
| 2003/0095650 A1 | 5/2003 | Mize |
| 2003/0096581 A1 | 5/2003 | Takamine |
| 2003/0103608 A1 | 6/2003 | Pearson et al. |
| 2003/0108184 A1* | 6/2003 | Brown et al. ............ 379/265.09 |
| 2003/0112938 A1 | 6/2003 | Kanakubo et al. |
| 2003/0119503 A1 | 6/2003 | Shohara et al. |
| 2003/0119522 A1 | 6/2003 | Barclay et al. |
| 2003/0133543 A1 | 7/2003 | Khakoo et al. |
| 2003/0133553 A1 | 7/2003 | Khakoo et al. |
| 2003/0133653 A1 | 7/2003 | De Barros et al. |
| 2003/0135562 A1 | 7/2003 | Himmel et al. |
| 2003/0135626 A1 | 7/2003 | Ray et al. |
| 2003/0148758 A1 | 8/2003 | McMullin |
| 2003/0152207 A1 | 8/2003 | Ryan |
| 2003/0187949 A1 | 10/2003 | Bhatt et al. |
| 2003/0193967 A1 | 10/2003 | Fenton et al. |
| 2003/0196206 A1 | 10/2003 | Shusman |
| 2003/0198322 A1 | 10/2003 | White, Jr. |
| 2003/0215070 A1 | 11/2003 | Akhteruzzaman et al. |
| 2003/0215078 A1 | 11/2003 | Brahm et al. |
| 2003/0219107 A1 | 11/2003 | Richardson et al. |
| 2004/0049545 A1 | 3/2004 | Lockridge et al. |
| 2004/0066928 A1 | 4/2004 | Leijonhufvud |
| 2004/0101118 A1 | 5/2004 | Powell |
| 2004/0101124 A1* | 5/2004 | Koch et al. ............... 379/220.01 |
| 2004/0109558 A1 | 6/2004 | Koch |
| 2004/0114603 A1 | 6/2004 | Suhail et al. |
| 2004/0114730 A1 | 6/2004 | Koch et al. |
| 2004/0120475 A1 | 6/2004 | Bauer et al. |
| 2004/0120478 A1 | 6/2004 | Reynolds et al. |
| 2004/0125929 A1 | 7/2004 | Pope |
| 2004/0171370 A1 | 9/2004 | Natarajan |
| 2004/0181587 A1 | 9/2004 | Cao |
| 2004/0192332 A1 | 9/2004 | Samn |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0213207 A1 | 10/2004 | Silver et al. |
| 2004/0213396 A1 | 10/2004 | MacNamara et al. |
| 2004/0218743 A1 | 11/2004 | Hussain et al. |
| 2004/0233892 A1 | 11/2004 | Roberts et al. |
| 2004/0242212 A1 | 12/2004 | Bacon et al. |
| 2004/0248560 A1 | 12/2004 | Bedingfield, Sr. et al. |
| 2005/0068166 A1 | 3/2005 | Baker |
| 2005/0073999 A1 | 4/2005 | Koch |
| 2005/0084084 A1* | 4/2005 | Cook et al. ............... 379/142.01 |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2005/0152525 A1 | 7/2005 | Kent, Jr. et al. |
| 2005/0157861 A1 | 7/2005 | Bossemeyer et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0062374 A1 | 3/2006 | Gupta |
| 2006/0152207 A1 | 7/2006 | Riebel et al. |
| 2006/0153173 A1 | 7/2006 | Beck et al. |
| 2006/0270392 A1 | 11/2006 | Scott et al. |
| 2007/0121825 A1 | 5/2007 | Walsh et al. |

FOREIGN PATENT DOCUMENTS

| | | |
|---|---|---|
| KR | 2002-0014945 | 2/2002 |
| WO | WO 97/50225 | 12/1997 |
| WO | WO 03/030501 | 4/2003 |
| WO | WO 03/030502 | 4/2003 |
| WO | WO 03/090432 A1 | 10/2003 |

OTHER PUBLICATIONS

U.S. Appl. No. 09/812,338, filed Mar. 19, 2001.
U.S. Appl. No. 09/992,165, filed Nov. 6, 2001.
U.S. Appl. No. 10/032,724, filed Dec. 27, 2001.
U.S. Appl. No. 10/144,555, filed May 13, 2002, Koch.
U.S. Appl. No. 10/144,556, filed May 13, 2002.
U.S. Appl. No. 10/152,544, filed May 21, 2002.
U.S. Appl. No. 10/174,026, filed Jun. 18, 2002.
U.S. Appl. No. 10/200,874, filed Jul. 23, 2002.
U.S. Appl. No. 10/200,905, filed Jul. 22, 2002, Ghazarian.
U.S. Appl. No. 10/200,906, filed Jul. 23, 2002.
U.S. Appl. No. 10/201,042, filed Jul. 23, 2002.
U.S. Appl. No. 10/201,706, filed Jul. 23, 2002.
U.S. Appl. No. 10/702,329, filed Nov. 6, 2003, Kreiner.
U.S. Appl. No. 10/746,804, filed Dec. 24, 2003, Perrella.
U.S. Appl. No. 10/884,504, filed Jul. 2, 2004, Kreiner.
U.S. Appl. No. 10/891,883, filed Jul. 15, 2004, Smith.
"Venture IP Telephone System" AASTRA (website) 2 pages <http://www.aastra.com/products/callerids/voicecallerid/be-6060.html> accessed on Aug. 1, 2005.
"Venture IP Telephone System" AASTRA (website) 2 pages <http://www.aastra.com/products/callerids/voicecallerid/be-6090.html> accessed on Aug. 1, 2005.
"Venture IP Telephone System" AASTRA (website) 2 pages <http://www.aastra.com/products/callerids/voicecallerid/be-9090.html> accessed on Aug. 1, 2005.
AASTRA Telecom "Voice-6090 Talking Caller ID" (website) 2 pages <http://aastra.com/products/callerids/voicecallerid/be-6090.html> accessed on Nov. 5, 2001.
Bellcore "LSSGR: LATA Switching Systems Generic Requirements: CLASS Feature: Calling Number Delivery" *Technical Reference TR-NWT-000031* Issue 4 (Dec. 1992).
Bellcore "LSSGR: LATA Switching Systems Generic Requirements: CLASSSM Feature: Calling Name Delivery Generic Reaquirements" *Technical Reference TR-NWT-001188* Issue 1 (Dec. 1991).
Boswell et al. "An Advanced HF Reciever Design" *HF Radio Sysems and Techniques: IEE Conference Publication No. 392* pp. 41-47 (Jul. 4-7, 1994).
Egevang et al. "The IP Network Address Translator (NAT)" May 1994.
Ericsson RBS 884 Pico "System Description Part 2" *1/1551-AE/LZB 119 2269 Uae Rev A* , 28 pages (Apr. 23, 1998).
Handley et al. "SIP Session Initiation Protocol" Mar. 1999.
Norris, "Transmitter Architectures", 1998, IEE, pp. 4/1-4/6.
OKI Silicon Solutions Company, Japan Site "Multi Lingual Test-to-Speech Processor ML2110" (website) 6 pages <http://www.okisemi.com/english/ml2110.htm> accessed on Mar. 31, 2006.
OKI Silicon Solutions Company, Japan Site "Multi-Lingual Text-to-Speech Processor ML2110" (website) 6 pages <http://www.oki.com/semi/English/ml2110.html> accessed on Nov. 1, 2001.
Rekhter et al. "Address Allocation for Private Internets" Feb. 1996.
Slawson "Caller ID Basics" 10 pages (Oct. 31, 2001) Originally Located at <http://www.testmark.com/develop/tml_callerid_cnt.hml> Currently Located at <http://www.picbasic.co.uk/support/tml_callerid_cnt.pdf>.
SmartHome "Talking Caller ID" (website) 3 pages <http://www.smarthome.com/5154.html> accessed on Nov. 5, 2001.
SmartHome "The Caller ID System that Speaks for Itself!" (website) 4 pages <http://www.smarthome.com/5154.html> accessed on Aug. 1, 2005.
Stealth Software "Talking Caller ID" (website) 4 pages <http://www.talkingcallerid.com> accessed on Aug. 1, 2005.
Stealth Software "Talking Caller ID" (website) 4 pages <http://www.talkingcallerid.com> accessed on Nov. 5, 2001.
Farley et al., "Cellular Telephone Basis: AMPS and Beyond", TelecomWriting.com, Mar. 6, 2003, pp. 1-8.
"Time Division Multiple Access (TDMA)", International Engineering Consortium, Author Unknown, Mar. 6, 2003, pp. 1-2.
Partridge, H1714, Mar. 3, 1998.
Aastra (quick links), http://www.aastra.com/products/callerids/voicecallerid/be-6060.html. Aug. 31, 2005, 2 pages.
Aastra (quick links), CNX Audio Conference Bridge, http://www.aastra.com/products/callerids/voicecallerid/be-9090.html. Aug. 31, 2005, 2 pages.

* cited by examiner

METHODS OF PROVIDING CALLER IDENTIFICATION INFORMATION AND RELATED REGISTRIES AND RADIOTELEPHONE NETWORKS

FIELD OF THE INVENTION

The present invention relates to telecommunications and more particularly to caller identification systems and methods for telecommunications.

BACKGROUND

A caller identification system provides a calling party's telephone number and/or other identifying information to the called party before answering a phone call. More particularly, a display at the called telephone provides the calling party's telephone number and/or other identifying information while the called party's telephone is ringing. Accordingly, the called party can decide whether or not to answer the phone call based on the identification of the calling party.

If the called party does not recognize the calling party, the called party may choose to not answer the call. Similarly, if a caller identification system is unable provide identifying information for the call, the called party may choose to not answer the call.

When a call is placed from a cellular radiotelephone, a caller identification system may not always be able to provide the telephone number and/or other identifying information for the calling cellular radiotelephone. More particularly, when a call is placed from a cellular radiotelephone outside its home network area (i.e. while roaming), a caller identification system may not always be able to provide the telephone number for the calling cellular radiotelephone at the called telephone.

For example, a host cellular network (other than the home network for the cellular radiotelephone) handling the call from the roaming cellular radiotelephone may not have access to sufficient information to identify the roaming cellular radiotelephone by telephone number. When a roaming cellular radiotelephone places a call, the host cellular network (other than the home cellular network for the radiotelephone) may only be provided with the electronic serial number (ESN) of the roaming cellular radiotelephone, which is used for billing purposes. As will be understood, the ESN is a unique number permanently assigned to a cellular radiotelephone when the radiotelephone is manufactured, and the ESN is permanently stored in Read Only Memory (ROM) of the cellular radiotelephone. Because the ESN is assigned to a radiotelephone when the radiotelephone is manufactured before a telephone number can be assigned to the radiotelephone, the ESN and the telephone number are different.

Desired calls from roaming cellular radiotelephones may thus be missed when the caller identification system fails to identify the source of the call so that the called party believes the call is from an unknown source. For example, a first family member may have an automobile breakdown in an area outside the home cellular network, and the first family member may place a cellular radiotelephone call home for assistance while roaming. Because the caller identification system fails to identify the source of the call, a second family member at home may decide to not answer the call believing the call to be from a stranger. Accordingly, the first family member may be unable to obtain timely assistance from home.

SUMMARY

According to embodiments of the present invention, caller identification information may be provided for a plurality of radiotelephone networks operated by a plurality of service providers. A registry may be provided including a first serial number and a first identification other than the first serial number for a first radiotelephone registered for service with a first service provider operating a first radiotelephone network. The registry may also include a second serial number and a second identification other than the second serial number for a second radiotelephone registered for service with a second service provider operating a second radiotelephone network. A caller identification request may be accepted from the second radiotelephone network operated by the second service provider wherein the caller identification request includes the first serial number for the first radiotelephone. Responsive to accepting the caller identification request, a caller identification response may be provided to the second radiotelephone network wherein the caller identification response includes the first identification for the first radiotelephone.

Providing the registry may include accepting the first serial number and the first identification from the first radiotelephone network operated by the first service provider, and the first serial number and the first identification may correspond to the first radiotelephone registered with the first service provider. Providing the registry may also include accepting the second serial number and the second identification from the second radiotelephone network operated by the second service provider, and the second serial number and the second identification may correspond to the second radiotelephone registered with the second service provider.

In addition, a second caller identification request may be accepted from the first radiotelephone network operated by the first service provider, and the second caller identification request may include the second serial number for the second radiotelephone. Responsive to accepting the second caller identification request, a second caller identification response may be provided to the first radiotelephone network, and the second caller identification response may include the second identification for the second radiotelephone.

Each serial number for each radiotelephone may be a unique alphanumeric sequence permanently stored in read only memory for the respective radiotelephone. More particularly, the serial numbers for the radiotelephones may be electronic serial numbers (ESNs) for the radiotelephones. The first identification may be at least one of a first telephone number and/or a first name of a user corresponding to the first radiotelephone, and the second identification may be at least one of a second telephone number and/or a second name of a user corresponding to the second radiotelephone. In an alternative, the serial number may be a telephone number for the radiotelephone, and the first identification may be a name of a registered user of the radiotelephone. Moreover, the registry may be maintained outside the first radiotelephone network operated by the first service provider and outside the second radiotelephone network operated by the second service provider.

According to additional embodiments of the present invention, caller identification may be provided for a radiotelephone communications system. A call set up request may be received from a roaming radiotelephone wherein the call set up request includes a serial number for the roaming radiotelephone and a telephone number for a called telephone. A caller identification request including the serial number for the roaming radiotelephone may be provided to a registry including serial numbers for a plurality of radiotelephones wherein the registry associates a serial number for each of the plurality of radiotelephones with a respective identification other than the serial number corresponding to the respective radiotelephone. Responsive to providing the serial number for the roaming radiotelephone, a caller identification response may be received from the registry, and the caller identification response may include an identification other than the serial number corresponding to the roaming radiotelephone. Responsive to receiving the identification corresponding to the roaming radiotelephone from the registry, the call set up request and the identification corresponding to the roaming radiotelephone may be forwarded from the registry to the called telephone.

Each serial number for each radiotelephone may be a unique alphanumeric sequence permanently stored in read only memory for the respective radiotelephone. More particularly, the serial numbers for the plurality of radiotelephones comprise electronic serial numbers (ESNs) for the plurality of radiotelephones. In an alternative, the serial number may be a telephone number for the radiotelephone, and the identification other than the serial number may be a name of a registered user of the radiotelephone.

The roaming radiotelephone may be roaming outside a home radiotelephone network for the roaming radiotelephone, and the home radiotelephone network for the roaming radiotelephone may be operated by a first service provider. Moreover, receiving the call set up request from the roaming radiotelephone may include receiving the call set up request at a radiotelephone network operated by a second service provider different than the first service provider. The roaming radiotelephone may be roaming in the radiotelephone network operated by the second service provider. In addition, billing information may be transmitted from the radiotelephone network operated by the second service provider to the home radiotelephone network operated by the first service provider. Moreover, the registry may be maintained outside the home radiotelephone network operated by the first service provider and outside the radiotelephone network operated by the second service provider.

After forwarding the call set up request, a telephone communication may be established between the roaming radiotelephone and the called telephone. Moreover, the called telephone may be at least one of another radiotelephone and/or a land-line telephone. A new telephone number may be assigned to a new radiotelephone wherein the new radiotelephone includes a serial number other than the new telephone number prior to assigning the new telephone number. In addition, the serial number for the new radiotelephone and at least one of the new telephone number and/or a name of a user of the new radiotelephone may be forwarded to the registry. Moreover, the identification other than the serial number corresponding to the roaming radiotelephone may be at least one of a telephone number and/or a name of a user corresponding to the roaming radiotelephone.

According to still additional embodiments of the present invention, a caller identification system for a radiotelephone communications system may include a database and a caller identification interface. The database may include a first serial number and a first identification other than the first serial number for a first radiotelephone registered for service with a first service provider operating a first radiotelephone network. The database may also include a second serial number and a second identification other than the second serial number for a second radiotelephone registered for service with a second service provider operating a second radiotelephone network. The caller identification interface may be configured to accept a caller identification request from the second radiotelephone network operated by the second service provider wherein the caller identification request includes the first serial number for the first radiotelephone.

The caller identification interface may be further configured to provide a caller identification response to the second radiotelephone network responsive to accepting the caller identification request. Moreover, the caller identification response may include the first identification for the first radiotelephone.

The database may be configured to accept the first serial number and the first identification from the first radiotelephone network operated by the first service provider, and the first serial number and the first identification may correspond to the first radiotelephone registered with the first service provider. The database may also be configured to accept the second serial number and the second identification from the second radiotelephone network operated by the second service provider, and the second serial number and the second identification may correspond to the second radiotelephone registered with the second service provider.

The caller identification interface may also be configured to accept a second caller identification request from the first radiotelephone network operated by the first service provider, and the second caller identification request may include the second serial number for the second radiotelephone. In addition, the caller identification interface may be configured to provide a second caller identification response to the first radiotelephone network responsive to accepting the second caller identification request, and the second caller identification response may include the second identification for the second radiotelephone.

Each serial number for each radiotelephone may be a unique alphanumeric sequence permanently stored in read only memory for the respective radiotelephone. More particularly, the serial numbers for the radiotelephones may be electronic serial numbers (ESNs) for the radiotelephones. The first identification may include at least one of a first telephone number and/or a first name of a user corresponding to the first radiotelephone, and the second identification may be at least one of a second telephone number and/or a second name of a user corresponding to the second radiotelephone. Moreover, the registry may be maintained outside the first radiotelephone network operated by the first service provider and outside the second radiotelephone network operated by the second service provider. In an alternative, the serial numbers for the radiotelephones may be telephone numbers, and the other identifications may be names of users of the respective radiotelephones.

According to yet additional embodiments of the present invention, a radiotelephone communications system may include a base station, a caller identification interface, and a communications interface. The base station may be configured to receive a call set up request from a roaming radiotelephone wherein the call set up request includes a serial number for the roaming radiotelephone other than a telephone number for the roaming radiotelephone and a telephone number for a called telephone. The caller identification interface may be configured to provide a caller identification request including the serial number for the roaming radiotelephone to a registry including serial numbers for a plurality of radiotelephones. More particularly, the registry may associate a serial number for each of the plurality of radiotelephones with a respective identification other than the serial number corresponding to the respective radiotelephone. Responsive to providing the serial number for the roaming radiotelephone, the communications interface may be further configured to receive a caller identification response including an identification other than the serial number corresponding to the roaming radiotelephone. The communications interface may be configured to forward the call set up request and the identification corresponding to the roaming radiotelephone from the registry to the called telephone after receiving the identification corresponding to the roaming radiotelephone from the registry.

Each serial number for each radiotelephone may be a unique alphanumeric sequence permanently stored in read only memory for the respective radiotelephone. More particularly, the serial numbers for the plurality of radiotelephones may be electronic serial numbers (ESNs) for the plurality of radiotelephones. In an alternative, the serial numbers may be telephone numbers for the respective radiotelephones, and the identifications other than the serial numbers may be names of registered users.

The radiotelephone communications system may be operated by a first service provider, and the roaming radiotelephone may be roaming outside a home radiotelephone network for the roaming radiotelephone. Moreover, the home radiotelephone network for the roaming radiotelephone may be operated by a second service provider different than the first service provider. Accordingly, the roaming radiotelephone may be roaming in the radiotelephone network operated by the first service provider. In addition, the communications interface may be further configured to transmit billing information to the home radiotelephone network operated by the second service provider. The registry may be maintained outside the radiotelephone communications system operated by the first service provider.

In addition, a mobile telephone switching office may be configured to establish a telephone communication between the roaming radiotelephone and the called telephone after forwarding the call set up request. The called telephone may include at least one of another radiotelephone and/or a land-line telephone. The identification other than the serial number corresponding to the roaming radiotelephone may be at least one of a telephone number and/or a name of a user corresponding to the roaming radiotelephone.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiment, a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

It will also be understood that although the terms first, second, etc. are used herein to describe various elements, these elements should not be limited by these terms. These terms are only used to distinguish one element or embodiment from another element or embodiment. Thus, a first element or embodiment could be termed a second element or embodiment, and similarly, a second element or embodiment may be termed a first element or embodiment without departing from the teachings of the present invention.

Figure 1:
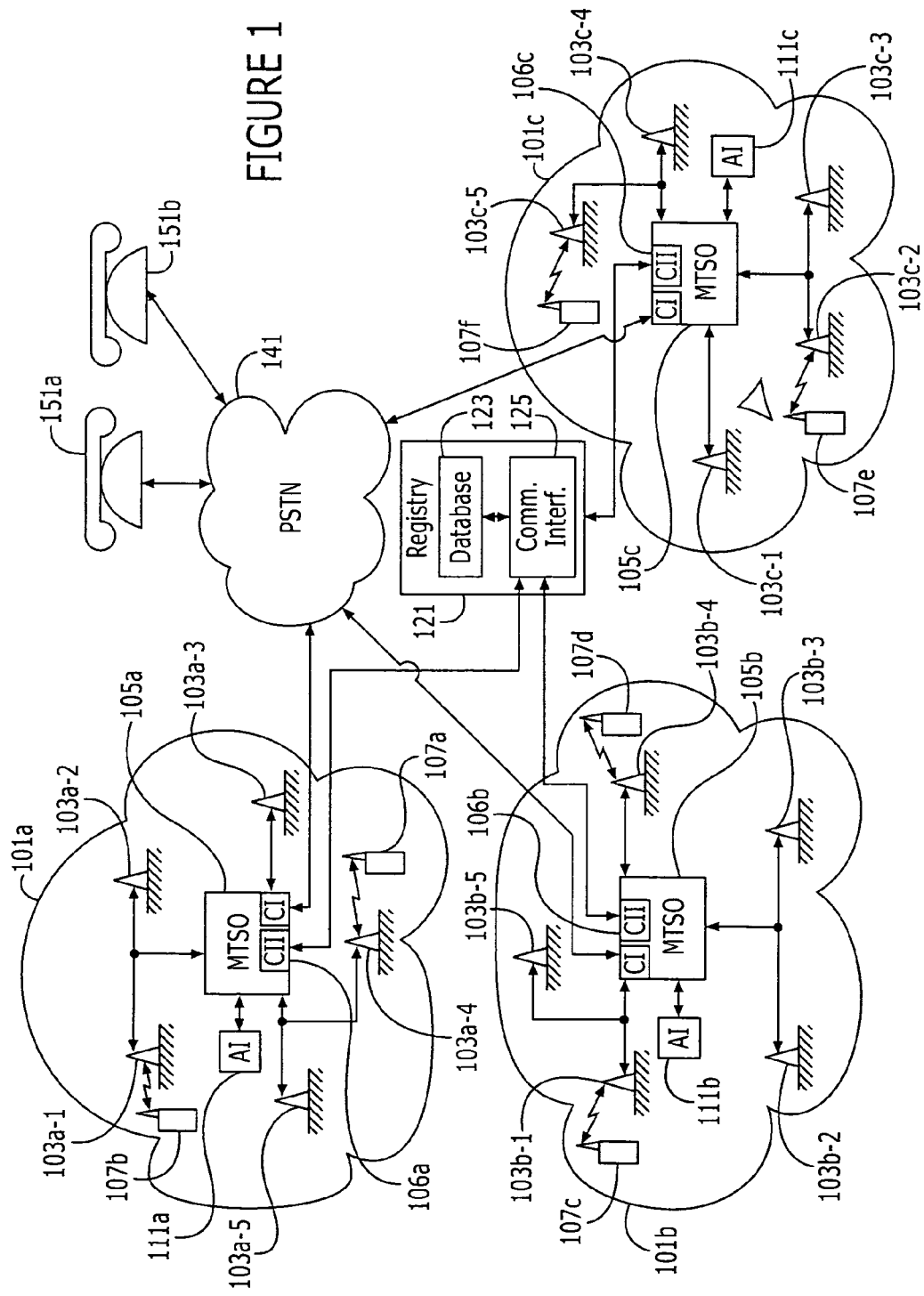
FIG. 1 is a block diagram illustrating radiotelephone networks and registries according to embodiments of the present invention.

According to embodiments of the present invention illustrated in FIG. 1, a plurality of radiotelephone networks 101a-c may be provided, with each radiotelephone network being operated by a respective service provider such as Verizon, Cingular, NextTel, AllTel, etc. Each radiotelephone network 101a-c may include a respective plurality of base stations 103a-c and mobile telephone switching offices (MTSOs) 105a-c to provide communications services for a plurality of radiotelephones 107a-f. Moreover, each of the radiotelephone networks 101a-c may be coupled to the public switched telephone network (PSTN) 141, and each of the radiotelephone networks 101a-c may be coupled to the other radiotelephone networks (either directly or through other networks such as the PSTN 141). Each radiotelephone network 101a-c may thus provide communications service for one or more of the radiotelephones 107a-f.

For example, the radiotelephone network 110a may provide communications service for radiotelephone 107b using base station 103a-1 and MTSO 105a while the radiotelephone 107b is within range of the base station 103a-1. Accordingly, the radiotelephone network 111a may provide a communications link during a telephone communication between the radiotelephone 107b and another radiotelephone operating in the network 101a, between the radiotelephone 107b and a radiotelephone operating in another radiotelephone network 101b or 101c, and/or between the radiotelephone 107b and a land-line telephone 151a or 151b coupled to the public switched telephone network 141. More particularly, a communications link between the radiotelephones 107a and 107b may be provided through the base stations 103a-1 and 103a-4 and the MTSO 105a. A communications link between the radiotelephones 107b and 107c may be provided through the base station 103a-1, MTSO 105a, MTSO 105b, and base station 103b-1. A communications link between radiotelephone 107b and either of the land-line telephones 151a-b may be provided through the base station 103a-1, MTSO 105a, and PSTN 141.

In addition, each of the radiotelephone networks may also provide for the hand-off of a radiotelephone from one base station to another during a communication. The radiotelephone 107b may move from a coverage area of base station 103a-1 to a coverage area of base station 103a-5 during a telephone conversation, and the MTSO 105a may coordinate the hand-off from the base station 103a-1 to the base station 103a-5 without interrupting the conversation. The radiotelephone networks 101b and 101c (operated by different service providers) may operate as discussed above with respect to radiotelephone network 101a.

While each of the radiotelephone networks 101a-c is illustrated in FIG. 1 with a single MTSO and five base stations for ease of illustration, it will be understood that each of the radiotelephone networks may include many more (or fewer) base stations, MTSOs, and/or other components. Accordingly, each of the radiotelephone networks 101a-c may support communications for radiotelephones across large regions. Each radiotelephone network 101a-c may be operated by a different service provider, and each radiotelephone network 101a-c may provide communications across large portions of the United States and/or another country or countries. Moreover, more or fewer networks may be included.

In addition, the radiotelephone networks are illustrated as covering physically separate areas. It should be understood, however, that the different radiotelephone networks may provide service for overlapping coverage areas. In addition, it should be further understood that a coverage area for a radiotelephone network may have coverage gaps therein and/or that a radiotelephone network may provide service over coverage areas that are not physically connected.

Accordingly, a user of radiotelephone 107b may be registered for service as a customer of a first service provider operating the radiotelephone network 101a, and a service contract with the first service provider may provide for unlimited usage of the radiotelephone 107b within the radiotelephone network 101a. As discussed above, however, there may be regions where the radiotelephone network 101a does not provide service because the radiotelephone network has not been built out in the region, because of interference, and/or because of shielding (from buildings and/or terrain). Some of the regions not covered by the radiotelephone network 101a, however, may be covered by one or both of the radiotelephone networks 101b-c operated by different service providers. Accordingly, two or more of the service providers operating the radiotelephone networks 101a-c may agree to allow radiotelephones registered for service in one network to "roam" in the other network(s) for an additional fee. Accordingly, a likelihood of being unable to communicate using a radiotelephone may be reduced.

For example, the radiotelephone 107b may be registered for service with the first service provider operating the radiotelephone network 101a. Moreover, agreements may be in place between the first service provider providing service for the radiotelephone network 101a, a second service provider providing service for the radiotelephone network 101b, and a third service provider providing service for the radiotelephone network 101c so that the radiotelephone 107b may roam in radiotelephone networks 101b and 101c. Accordingly, the radiotelephone 107b may first attempt to obtain communications service through a base station of the radiotelephone network 101a. If service is not available through a base station of the radiotelephone network 101a, the radiotelephone 107b may attempt to establish communications using a base station of either of the radiotelephone networks 101b-c. The radiotelephone 107b may thus roam in either of the other radiotelephone networks 101b-c.

When the radiotelephone 107b is registered for service in the radiotelephone network 101a the service provider operating the radiotelephone network 101a may obtain information from the user to support the service. The service provider, for example, may obtain registration information including a serial number (such as an Electronic Serial Number, i.e. ESN) of the radiotelephone 107b, a name of the user of the radiotelephone 107b, a billing address for the user of the radiotelephone 107b, a service package selected by the user of the radiotelephone 107b, and/or other service and/or billing information for the radiotelephone 107b. The radiotelephone serial number may be a unique alphanumeric sequence programmed into read only memory of the radiotelephone when the radiotelephone is manufactured. During the registration process, a telephone number (also referred to as a mobile identification number, i.e. MIN) is assigned to the radiotelephone and the telephone number is stored in memory of the radiotelephone. The telephone number is not usually stored in the radiotelephone until the radiotelephone is registered with a service provider because it is difficult to know at the time the radiotelephone is manufactured where the phone will be purchased and in what network the radiotelephone will be used. Accordingly, the radiotelephone serial number may be permanent while the telephone number may be programmed and reprogrammed.

The information obtained by the service provider operating the radiotelephone network 111a can thus be stored in account information (AI) database 111a and used when providing service for the registered radiotelephone 107b. When the radiotelephone 107b is communicating through the radiotelephone network 101a, the radiotelephone network 101a may reference the account information database 111a to determine the appropriate package of services to be provided for the radiotelephone 107b. The account information database 111a may also be used to track usage of radiotelephone 107b and/or to generate bills for the user of the radiotelephone 107b.

In addition, the account information database 111a may be used to provide caller identification information when the radiotelephone 107b initiates a call from within the radiotelephone network 101a with which it is registered. More particularly, the radiotelephone 107b may transmit a call set up request to a base station of the radiotelephone network 101a with which it is registered, and the call set up request may identify the telephone with which the call is to be established. The radiotelephone network 101a can then forward the call set up request to the telephone with which the call is to be established and the call set up request can include caller identification information (such as the user's name and/or telephone number) obtained from the account information database 111a. Account information databases 111b and 111c of radiotelephone networks 101b and 101c may operate as discussed above with respect to account information data base 111a.

Accordingly, each radiotelephone network 101a-c may include a respective account information database 111a-c with information for each radiotelephone registered for service with that radiotelephone network. Accordingly, a radiotelephone network establishing a call for a radiotelephone registered for service within that network may be able to forward a call set up request to a called phone using information stored in its respective account information database to support caller identification. When a radiotelephone network establishes a call for a radiotelephone not registered for service with that radiotelephone network (i.e. for a roaming radiotelephone), however, the radiotelephone network may be unable to support caller identification using information in the account information database of that network.

According to embodiments of the present invention, a central registry 121 may be provided to support caller identification for radiotelephones roaming out of network. The registry 121, for example, may include a database 123 of radiotelephone serial numbers (such as ESNs) for radiotelephones registered for service with each of the radiotelephone networks and a communications interface 125 providing communications with the radiotelephone networks. Similarly, each MTSO 105 may include a communications interface 106 providing communications with the registry 121.

More particularly, the database 123 may relate the radiotelephone serial numbers to caller identification information such as respective user names and/or radiotelephone telephone numbers (e.g. MINs). As shown, the registry 121 is coupled with each of the radiotelephone networks 101a-c, so that each of the networks can access the registry when setting up a call for a roaming radiotelephone.

Information for a radiotelephone can be provided to the registry 121 when the radiotelephone is registered for service with a respective radiotelephone network. As discussed above with respect to radiotelephone 107b, for example, the radiotelephone 107b may be registered for service with the radiotelephone network 101a. More particularly, the serial number for the radiotelephone 107b (such as an ESN) and account and billing information may be provided to the account information-database 111a, a telephone number (such as an MIN) may be assigned to the radiotelephone 107b, and the telephone number may be saved in the radiotelephone 107b and in the account information database. According to embodiments of the present invention, the radiotelephone serial number and caller identification information (such as the user's name and/or the telephone number) may also be transmitted from the radiotelephone network 101a to the database 123 of registry 121 at the time of registration. Accordingly, the registry entries for a radiotelephone can be made at the same time that the radiotelephone is registered for service with a radiotelephone network, and the registry entries can be made automatically.

Caller identification operations performed by the radiotelephone network 101a when the radiotelephone 107b (registered for service in radiotelephone network 101a) transmits a call set up request to a base station of the network 101a are discussed above. If a radiotelephone 107e (registered for service in radiotelephone network 101a) initiates a call while roaming in radiotelephone network 101c, by transmitting a call set up request to base station 103c-2 of network 101c, however, the account information database 111c may be unable to provide caller identification information when the call set up request is forwarded to the called telephone. Accordingly, the caller-identification information may be obtained from the registry 121.

More particularly, a database 123 of the registry 121 may include a first serial number and a first identification other than the first serial number for the radiotelephone 107e which may be registered for service with the service provider operating the radiotelephone network 101a and a second serial number and a second identification other than the second serial number for the radiotelephone 107d registered for service with the service provider operating the radiotelephone network 101c. While registered for service with the indicated networks, the radiotelephones 107d and 107e may roam in networks other than the respective networks in which they are registered. As shown in FIG. 1, radiotelephone 107d may roam in network 101b, and radiotelephone 107e may roam in network 101c.

The serial number for each radiotelephone may be a unique alphanumeric sequence permanently stored in read only memory for the respective radiotelephone. More particularly, the serial number for each of the radiotelephones may be an electronic serial number (ESN), and the identification other than the serial number for each of the radiotelephones may be a telephone number and/or a name of a user of the radiotelephone. In an alternative, the serial number may be a telephone number of the radiotelephone, and the identification other than the serial number may be a name of a registered user.

While the database 123 is discussed, by way of example, as including serial numbers and caller identification information for two radiotelephones, the database 123 may include serial numbers and caller identification information for many radiotelephones. Accordingly, caller identification may be supported for many radiotelephones when roaming. Moreover, the registry 121 including the database 123 may be operated outside of and/or independent of any of the radiotelephone networks 101a-c. For example, the registry 121 may be operated by an entity other than service providers operating the networks 101a-c. In an alternative, the registry 121 may be operated by one of the service providers operating one of the networks 101a-c.

The entries for radiotelephones in the database 123 can be made at the time the respective radiotelephone is registered for service with a radiotelephone network. For example, the first serial number and the first identification for the radiotelephone 107e may be provided to the registry 121 when the radiotelephone 107e is initially registered with the radiotelephone network 101a. Similarly, the second serial number and the second identification for the radiotelephone 107d may be provided to the registry 121 when the radiotelephone 107d is initially registered with the radiotelephone network 101c. As discussed above, when a radiotelephone is registered for service with a radiotelephone network, a radiotelephone serial number may be provided to the network, a telephone number may be assigned to the radiotelephone, and the serial number, the telephone number, the user name, and other billing information may be entered into the account information database for the network. At that time, the network can automatically transmit the serial number and caller identification information to the registry.

As discussed above, the radiotelephone 107e may be registered with the network 101a, but the radiotelephone 107e may roam in network 101c, for example, when out of range of base stations 103a of radiotelephone network 101a. As shown in FIG. 1, the radiotelephone 107e may be within range of base station 103c-2 when roaming in radiotelephone network 101c. Accordingly, if a call is placed from the radiotelephone 107e roaming in network 101c, a call set up request may be transmitted from the radiotelephone 107e to the base station 103c-2, and the call set up request may include a serial number of the radiotelephone 107e and a telephone number for the telephone being called.

The call set up request from the radiotelephone 107e may be received at the base station 103c-2 of network 103c, and provided to the MTSO 105c. As discussed above, the call set up request may include the serial number for the radiotelephone 107e and the telephone number for the called telephone, and the serial number for the radiotelephone 107e may be compared with serial numbers saved in the account information database 111c in an attempt to obtain caller identification information for the radiotelephone 107e. Because the radiotelephone 107e is registered for service in another network (network 101a), the account information database 111c may be unable to provide caller identification information for the roaming radiotelephone 107e. In an alternative, the MTSO 105c and/or the account information database 111c may use the serial number of radiotelephone 107e to determine that the radiotelephone 107e is roaming and not registered for service with the network 101c.

Upon determining that sufficient caller identification information cannot be obtained from the account information database 111c and/or upon determining that the radiotelephone 107c is roaming, the MTSO 105c may provide a caller identification request (including the serial number for radiotelephone 107c) to the registry 121 to obtain caller identification information for the radiotelephone 107e. More particularly, the caller identification request may be provided from a caller identification interface 106c of the MTSO 105c to a communications interface 125 of the registry 121, and the serial number may be provided from the communications interface 125 of the registry 121 to the database 123 of the registry 121.

As discussed above, the database 123 of the registry 121 may include serial numbers for a plurality of radiotelephones registered for use with different radiotelephone networks. Moreover, the database 123 of the registry 121 may associate a serial number for each of the plurality of radiotelephones with a respective identification other than the serial number corresponding to the respective radiotelephone. More particularly, the database 123 may associate the serial number for each of the plurality of radiotelephones with caller identification information such as a respective telephone number and/or a respective user name. Upon obtaining the caller identification information corresponding to the serial number for radiotelephone 107e received from network 101c, the communications interface 125 of registry 121 may transmit a caller identification response that is received by the caller identification interface 106c of MTSO 105c. More particularly, the caller identification response may include the caller identification information for the radiotelephone 107e obtained from database 123.

Once the caller identification response is received from the registry 121, the MTSO may forward the call set up request from the radiotelephone 107e to the called telephone (identified by the telephone number in the original call set up request). Moreover, the call set up request transmitted to the called telephone may include the caller identification information received from the registry 121. For example, the telephone number in the call set up request may identify the land-line telephone 151a as the called telephone. Upon receiving the call-set up request, the called telephone 151a may provide notification of the call (such as by ringing), and the called telephone 151a may provide the caller identification information identifying the calling radiotelephone 107e. While ringing, for example, the called telephone 151a may provide the caller identification information (such as a telephone number for the radiotelephone 107e and/or a name of a registered user of the radiotelephone 107e) on a display (such as a liquid crystal display).

Accordingly, a user of the telephone 151a may determine who is calling before answering the call. If the user of the telephone 151a answers the call, a telephone communication may be established between the telephone 151a and the roaming radiotelephone 107e. In alternatives, the telephone number in the call set up request may identify another radiotelephone (such as radiotelephone 107a-d or 107f) or another land-line telephone such as telephone 151b, and caller identification may be provided as discussed above. Moreover, once the telephone communication is complete, the billing information for the communication may be transmitted from the radiotelephone network 101c in which the radiotelephone 107e is roaming to the radiotelephone network 101a in which the radiotelephone 107e is registered for service (i.e. the home network for the radiotelephone 107e). The radiotelephone network 101c may determine the home network for the roaming radiotelephone 107e using information received from the registry 121 and/or from another registry and/or database.

Operations according to embodiments of the present invention are discussed above with respect to radiotelephone 107e roaming in radiotelephone network 101c. Caller identification information can similarly be provided for radiotelephones other than radiotelephone 107e registered for service in radiotelephone networks other than network 101a roaming in radiotelephone networks other than network 101c. For example, the radiotelephone 107d may be registered for service with radiotelephone network 101c, and the radiotelephone 107d may be roaming in network 101b. If a call set up request is transmitted from the radiotelephone 107d to the base station 103n-4 of network 101b, the caller identification information can be obtained from the registry 121 as discussed above with respect to radiotelephone 107e and network 101c.

Figure 2:
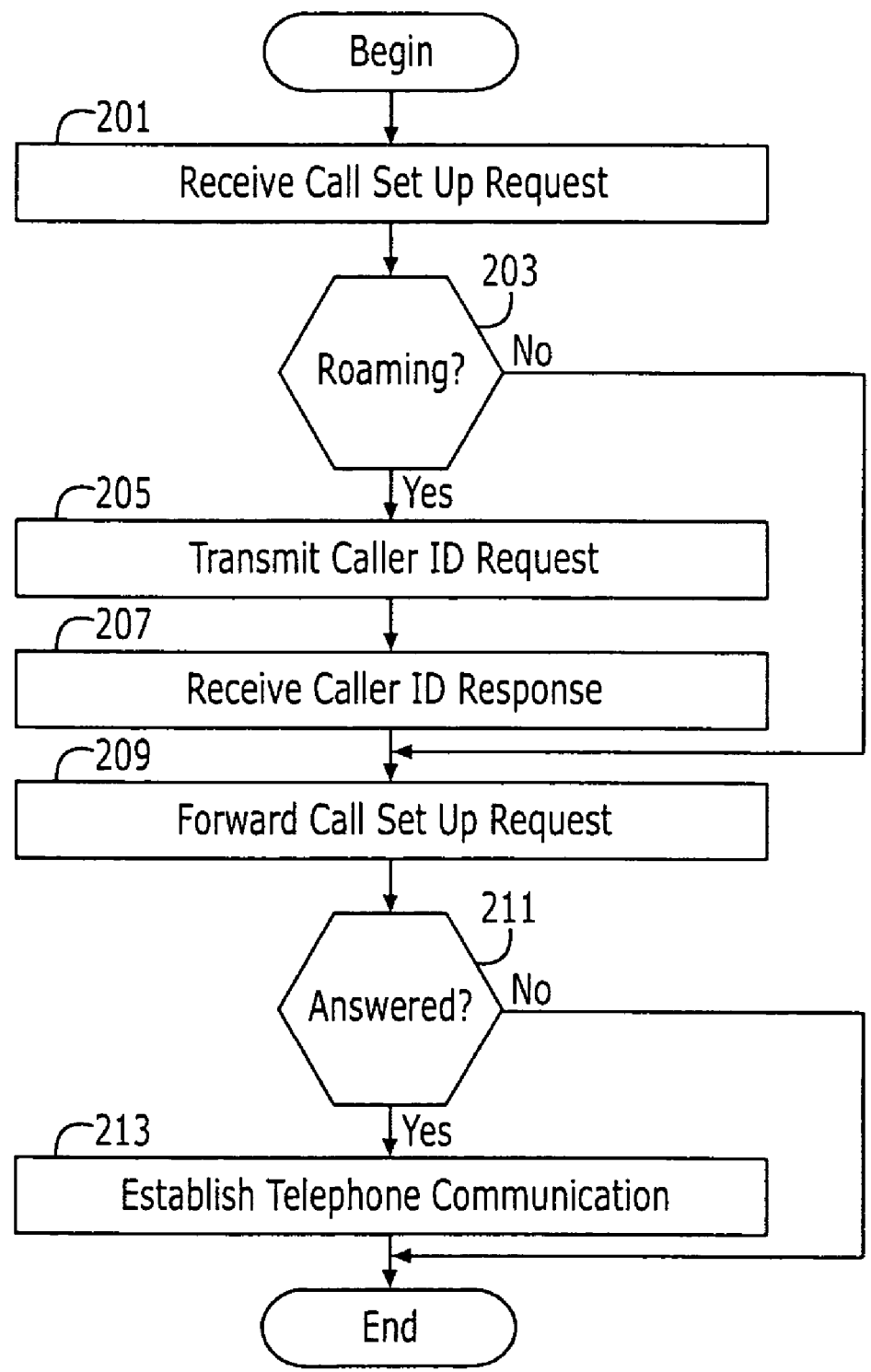
FIG. 2 is a flow chart illustrating operations of a radiotelephone network according to embodiments of the present invention.

FIG. 2 is a flow chart illustrating operations of a radiotelephone network establishing a call responsive to a call set up request according to embodiments of the present invention. When a call set up request is received by a radiotelephone network at block 201, the radiotelephone network determines if the radiotelephone generating the call set up request is registered for service with the radiotelephone network receiving the request or if the radiotelephone generating the request is registered for service with another radiotelephone network. In other words, the radiotelephone network determines if the radiotelephone generating the call set up request is roaming in the network at block 203. As discussed above, the call set up request may include the serial number of the radiotelephone generating the call set up request and the telephone number of the telephone being called.

As used herein, the term roaming may refer to a radiotelephone operating with a radiotelephone network other than its home network. For example, a radiotelephone may roam in another radiotelephone network when the radiotelephone is outside a geographic coverage area of its home network and/or when the radiotelephone is in a dead zone within a geographic coverage area of its home network. When roaming, the radiotelephone may operate in a network (or a portion thereof) that does not have access to an account information database having caller identification information for the roaming radiotelephone.

If the radiotelephone generating the call set up request is registered for service with the radiotelephone network receiving the call set up request as determined at block 203 (i.e. the radiotelephone is not roaming), the radiotelephone network may proceed to forward the call set up request to the called radiotelephone at block 209. In this case, the call set up request may include caller identification information obtained from within the radiotelephone network. If the call set up request is answered at block 211, a telephone communication can be established between the calling radiotelephone and the called telephone. Here the called telephone may be another radiotelephone and/or a land-line telephone.

If the radiotelephone generating the call set up request is not registered for service with the radiotelephone network receiving the call set up request as determined at block 203 (i.e. the radiotelephone is roaming), caller identification information for the roaming radiotelephone may not be available at the radiotelephone network. Accordingly, a caller identification request including the serial number of the radiotelephone may be transmitted to a caller identification registry at block 205. The caller identification registry may include serial numbers for a plurality of radiotelephones registered for service with different radiotelephone networks, and the registry may associate a serial number for each of the plurality of radiotelephones with a respective identification other than the serial number corresponding to the respective radiotelephone number.

Accordingly, the registry may respond with a caller identification response including caller identification information corresponding to the radiotelephone generating the call set up request. The caller identification response from the registry may be received at block 207, and the call set up request may be forwarded to the called radiotelephone with the caller identification information received from the registry. Accordingly, the called radiotelephone may provided notification of the call (such as by ringing), and the called radiotelephone may provide the caller identification information received from the registry. If the called radiotelephone is answered at block 211, a telephone communication may be established at block 213.

Figure 3:
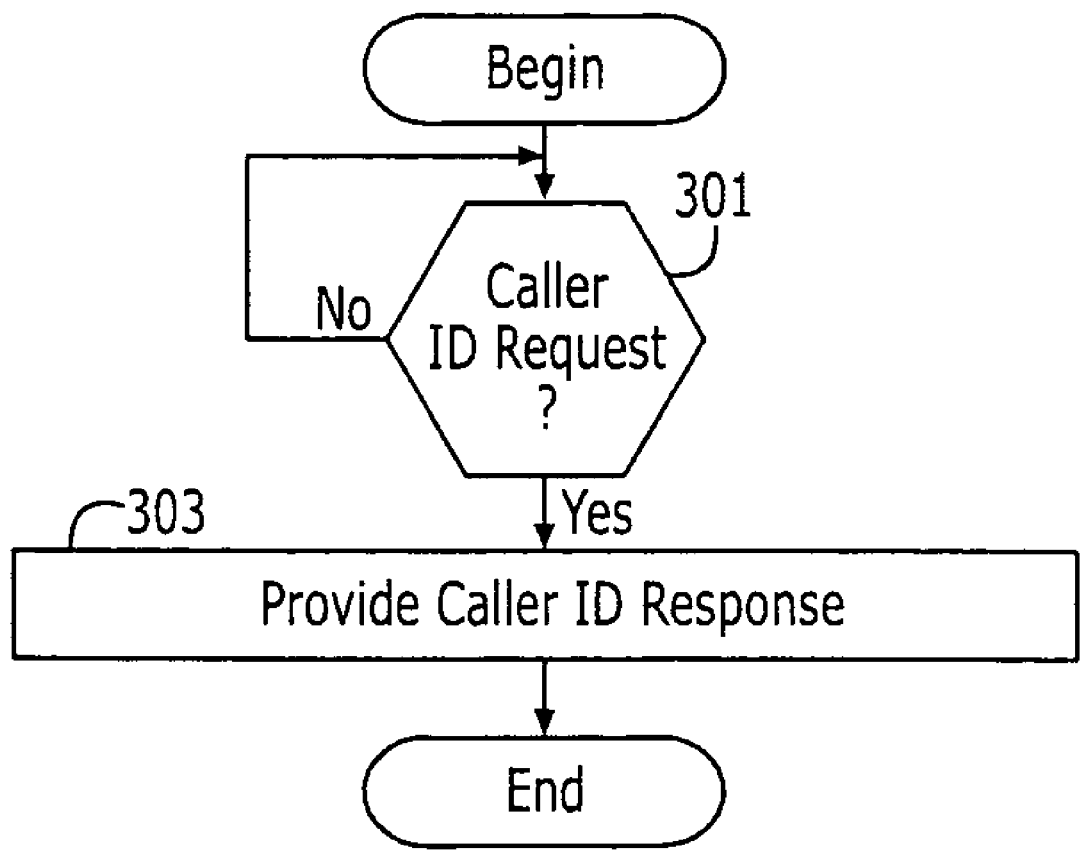
FIG. 3 is a flow chart illustrating operations of a caller identification registry according to embodiments of the present invention.

FIG. 3 is a flow chart illustrating operations of a caller identification registry according to embodiments of the present invention. As discussed above, a radiotelephone network may transmit a caller identification request to a caller identification registry when a call set up request is received from a radiotelephone roaming in the network. When the caller identification request is received at the registry at block 301, the registry may proceed to provide a caller identification response at block 303 to the radiotelephone network that generated the request. More particularly, the caller identification request may include a serial number for the radiotelephone generating the call set up request, and the registry may use the serial number of the radiotelephone to obtain caller identification information for the radiotelephone. Accordingly, the caller identification response may include the caller identification information for the radiotelephone.

In the drawings and specification, there have been disclosed typical preferred embodiments of the invention and, although specific terms are employed, they are used in a generic and descriptive sense only and not for purposes of limitation, the scope of the invention being set forth in the following claims. It should be emphasized that the term "comprises/comprising" when used in this specification is taken to specify the presence of stated features, integers, steps or components but does not preclude the presence or addition of one or more other features, integers, steps, components or groups thereof.

That which is claimed is:

1. A method of providing caller identification information for a plurality of radiotelephone networks operated by a plurality of service providers, the method comprising:
    providing a registry including a first serial number and a first identification other than the first serial number for a first radiotelephone registered for service with a first service provider operating a first radiotelephone network and a second serial number and a second identification other than the second serial number for a second radiotelephone registered for service with a second service provider operating a second radiotelephone network;
    accepting a caller identification request from the second radiotelephone network operated by the second service provider when a determination is made that the first radiotelephone is roaming in the second radiotelephone network, wherein the caller identification request includes the first serial number for the first radiotelephone;
    responsive to accepting the caller identification request, providing a caller identification response to the second radiotelephone network wherein the caller identification response includes the first identification for the first radiotelephone;
    transmitting billing information from the second radiotelephone network to the first radiotelephone network, the second radiotelephone network determining the first radiotelephone network based on data in the registry;
    accepting a second caller identification request from the first radiotelephone network operated by the first service provider when a determination is made that the second radiotelephone is roaming in the first radiotelephone network, wherein the second caller identification request includes the second serial number for the second radiotelephone;
    responsive to accepting the second call identification request, providing a second caller identification response to the first radiotelephone network wherein the second caller identification response includes the second identification for the second radio telephone;
    transmitting billing information from the first radiotelephone network to the second radiotelephone network, the first radiotelephone network determining the second radiotelephone network based on data in the registry.

2. A method according to claim 1 wherein providing the registry comprises,
    accepting the first serial number and the first identification from the first radiotelephone network operated by the first service provider wherein the first serial number and the first identification correspond to the first radiotelephone registered with the first service provider, and
    accepting the second serial number and the second identification from the second radiotelephone network operated by the second service provider wherein the second serial number and the second identification correspond to the second radiotelephone registered with the second service provider.

3. A method according to claim 1 wherein the serial numbers for the radiotelephones comprise electronic serial numbers (ESNs) for the radiotelephones.

4. A method according to claim 1 wherein each serial number for each radiotelephone comprises a unique alphanumeric sequence permanently stored in read only memory for the respective radiotelephone.

5. A method according to claim 1 wherein the first identification comprises at least one of a first telephone number and/or a first name of a user corresponding to the first radiotelephone and wherein the second identification comprises at least one of a second telephone number and/or a second name of a user corresponding to the second radiotelephone.

6. A method according to claim 1 wherein the registry is maintained outside the first radiotelephone network operated by the first service provider and outside the second radiotelephone network operated by the second service provider.

7. A caller identification system for a radiotelephone communications system, the caller identification system comprising:
    a database including a first serial number and a first identification other than the first serial number for a first radiotelephone registered for service with a first service provider operating a first radiotelephone network and a second serial number and a second identification other than the second serial number for a second radiotelephone registered for service with a second service provider operating a second radiotelephone network; and
    a caller identification interface configured to accept a caller identification request from the second radiotelephone network operated by the second service provider when a determination is made that the first radiotelephone is roaming in the second radiotelephone network, wherein the caller identification request includes the first serial number for the first radiotelephone, and responsive to accepting the caller identification request, the caller identification interface being further configured to provide a caller identification response to the second radiotelephone network wherein the caller identification response includes the first identification for the first radiotelephone wherein the caller identification interface is further configured to, accept a second caller identification request from the first radiotelephone network operated by the first service provider when a determination is made that the second radiotelephone is roaming in the first radiotelephone network, wherein the second caller identification request includes the second serial number for the second radiotelephone;

responsive to accepting the second call identification request, to provide a second caller identification response to the first radiotelephone network wherein the second caller identification response includes the second identification for the second radio telephone.

8. A caller identification system according to claim 7 wherein the data base is configured to, accept the first serial number and the first identification from the first radiotelephone network operated by the first service provider wherein the first serial number and the first identification correspond to the first radiotelephone registered with the first service provider, and accept the second serial number and the second identification from the second radiotelephone network operated by the second service provider wherein the second serial number and the second identification correspond to the second radiotelephone registered with the second service provider.

9. A caller identification system according to claim 7 wherein the serial numbers for the radiotelephones comprise electronic serial numbers (ESNs) for the radiotelephones.

10. A caller identification system according to claim 7 wherein each serial number for each radiotelephone comprises a unique alphanumeric sequence permanently stored in read only memory for the respective radiotelephone.

11. A caller identification system according to claim 7 wherein the first identification comprises at least one of a first telephone number and/or a first name of a user corresponding to the first radiotelephone and wherein the second identification comprises at least one of a second telephone number and/or a second name of a user corresponding to the second radiotelephone.

12. A caller identification system according to claim 7 wherein the database is maintained outside the first radiotelephone network operated by the first service provider and outside the second radiotelephone network operated by the second service provider.

* * * * *